US008904384B2

(12) United States Patent
Low et al.

(10) Patent No.: US 8,904,384 B2
(45) Date of Patent: Dec. 2, 2014

(54) REDUCING DATA TRANSFER OVERHEAD DURING LIVE MIGRATION OF A VIRTUAL MACHINE

(75) Inventors: Andrew R. Low, Stittsville (CA); Prashanth K. Nageshappa, Bangalore (IN); Sathiskumar Palaniappan, TamilNadu (IN); Balbir Singh, Bangalore (IN)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 647 days.

(21) Appl. No.: 13/160,078

(22) Filed: Jun. 14, 2011

(65) Prior Publication Data

US 2012/0324443 A1    Dec. 20, 2012

(51) Int. Cl.
*G06F 9/455*    (2006.01)
*G06F 9/45*    (2006.01)
*G06F 9/50*    (2006.01)

(52) U.S. Cl.
CPC .......... *G06F 9/45504* (2013.01); *G06F 9/5088* (2013.01)
USPC .............................................. 718/1; 717/148

(58) Field of Classification Search
None
See application file for complete search history.

(56) References Cited

U.S. PATENT DOCUMENTS

| 7,191,441 | B2 * | 3/2007 | Abbott et al. ...................... 718/1 |
| 2009/0070776 | A1 * | 3/2009 | Dahlstedt ....................... 719/312 |
| 2010/0325279 | A1 | 12/2010 | Heim |
| 2011/0099318 | A1 * | 4/2011 | Hudzia et al. ..................... 711/6 |
| 2011/0131568 | A1 * | 6/2011 | Heim ................................ 718/1 |
| 2012/0209812 | A1 * | 8/2012 | Bezbaruah et al. ........... 707/646 |

OTHER PUBLICATIONS

Jin, et al. "Live Virtual Machine Migration with Adaptive Memory Compression", Services Computing Technology and System Lab Cluster and Grid Computing Lab School of Computer Science and Technology, Huazhong University of Science and Technology, Wuhan, 430074, China, 11 pages.
Hines, et al. "Post-Copy Live Migration of Virtual Machines" Computer Science, Binghamton University, 13 pages.

* cited by examiner

*Primary Examiner* — Kenneth Tang
(74) *Attorney, Agent, or Firm* — Katherine S. Brown; Jeffrey L. Streets

(57) ABSTRACT

A computer-implemented method is provided for reducing network traffic associated with live migration. The method comprises selecting a virtual machine on a first physical host for migration to a second physical host, and providing each application running in the selected virtual machine with notification that the migration has started. In response to receiving the notification that the migration has started, each application reducing the number of memory pages in use during the migration. The selected virtual machine and each application is then migrated from the first physical host to the second physical host, wherein the migration of each application includes migration of the reduced number of memory pages. Non-limiting examples of methods that may be used to reduce the number of memory pages includes identifying memory that contains garbage, reducing the size of the heap, increasing the pause time used for garbage collection, deferring just-in-time compilation of hot methods, and releasing caches and buffers.

9 Claims, 6 Drawing Sheets

REDUCING DATA TRANSFER OVERHEAD DURING LIVE MIGRATION OF A VIRTUAL MACHINE

BACKGROUND

1. Field of the Invention

The present invention relates to workload management in computer systems. More specifically, the present invention relates to the live migration of virtual machines.

2. Background of the Related Art

In a cloud computing environment, a management system performs constant monitoring of numerous compute nodes that make up the cloud. Accordingly, the management system may take steps to balance the load among the individual compute nodes, and may deploy workloads to compute nodes, such as servers, that are able to perform appropriately.

In various implementations, the management system is the centralized point for workload distribution and has access to information about the condition of all servers and all workloads. The management system collects this information and uses it to determine how to move and rearrange workloads to accomplish one or more operational objective. The management system, such as a management server, may be limited as to what information it can collect about the individual servers or hosts. In some systems, server operating conditions are exposed to the management server so that the management server can make a more informed decision as to which host should run a given workload. However, as more information is shared with the management system, the management system may require hardware and software upgrades in order to be able to manage the larger infrastructure.

Live migration is a technology that enables movement of a virtual machine, and a guest application running in the virtual machine, from one physical host to another physical host without having to stop the guest application. The memory and execution state of the running guest application is copied over the network from one host to another to achieve the migration.

Live migration has significant advantages in the virtualized and cloud environment. For example, live migration may be used to manage resources in a cloud computing environment, where a single cloud computing provider may have thousands of guests running in their data centers. In order to save energy, reduce costs and balance the load on the servers, the provider will move the guests among the servers using live migration without disrupting their customers' guest applications. In a situation where resources, such as a processor or memory, are constrained on one physical server in the cloud, a guest application can be migrated to a less-heavily loaded server within a migration domain.

Another significant advantage of live migration is the fact that it facilitates proactive maintenance. If an imminent failure is suspected, the guest applications can be migrated off of the suspected hardware and continue running without disruption of service. Once the potential problem has been resolved, the suspected hardware may be made available to run various applications.

BRIEF SUMMARY

One embodiment of the present invention provides a computer-implemented method for reducing network traffic associated with live migration. The method comprises selecting a virtual machine on a first physical host for migration to a second physical host, and providing each application running in the selected virtual machine with notification that the migration has started. In response to receiving the notification that the migration has started, each application reducing the number of memory pages in use during the migration. The selected virtual machine and each application is then migrated from the first physical host to the second physical host, wherein the migration of each application includes migration of the reduced number of memory pages.

Another embodiment of the present invention provides a computer program product including computer usable program code embodied on a computer usable storage medium for reducing network traffic associated with live migration. The computer program product comprises computer usable program code for selecting a virtual machine on a first physical host for migration to a second physical host, and computer usable program code for providing each application running in the selected virtual machine with notification that the migration has started. The computer program product further includes computer usable program code for each application reducing the number of memory pages in use during the migration in response to receiving the notification that the migration has started, and computer usable program code for migrating the selected virtual machine and each application from the first physical host to the second physical host, wherein the migration of each application includes migration of the reduced number of memory pages.

DETAILED DESCRIPTION

Figure 1:
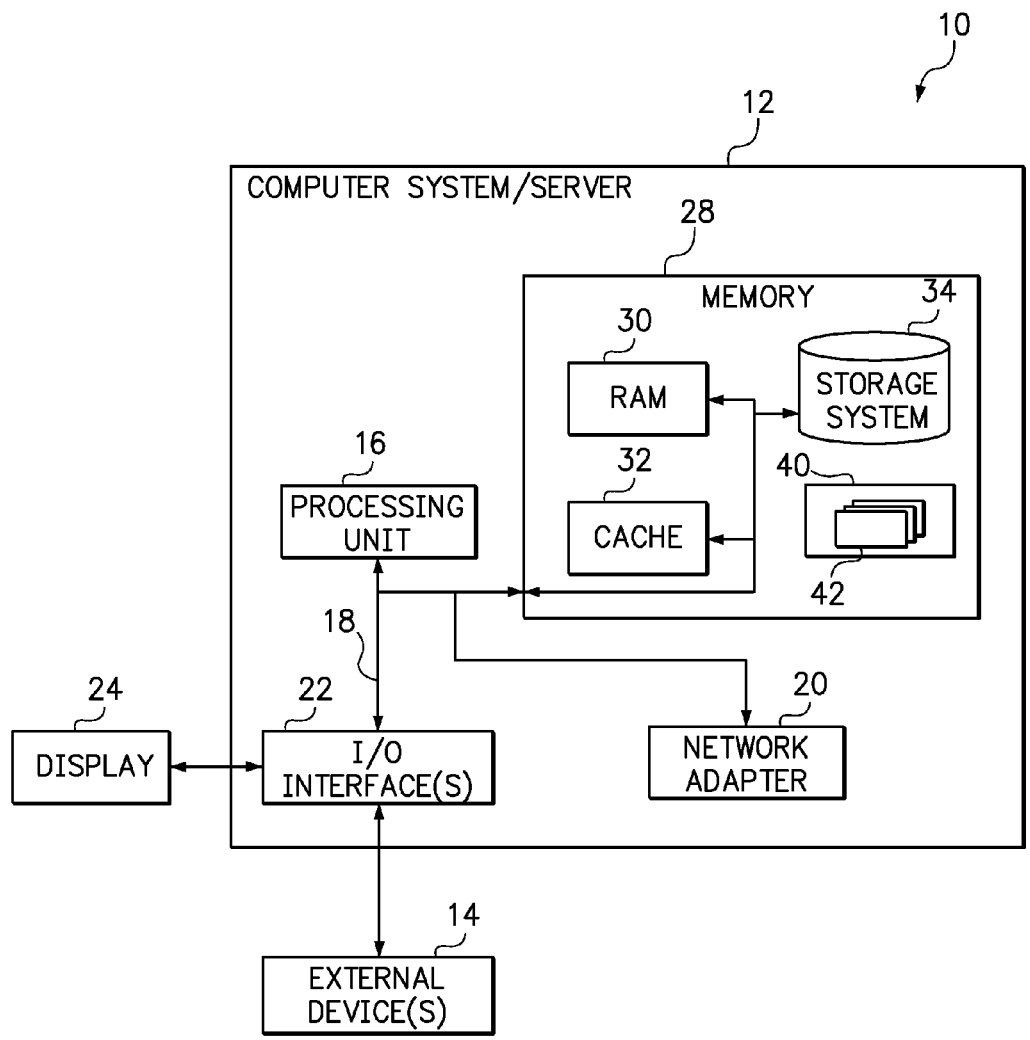
FIG. 1 is a diagram of a cloud computing node according to one or more embodiment of the present invention.

One embodiment of the present invention provides a computer-implemented method for reducing network traffic associated with live migration. The method comprises selecting a virtual machine on a first physical host for migration to a second physical host, and providing each application running in the selected virtual machine with notification that the migration has started. In response to receiving the notification that the migration has started, each application reducing the number of memory pages in use during the migration. The selected virtual machine and each application is then migrated from the first physical host to the second physical host, wherein the migration of each application includes migration of the reduced number of memory pages.

The invention may be used, in one optional implementation, where at least a first application running on the selected virtual machine uses managed memory. For example, managed memory is one of the major benefits provided by the JAVA platform. (JAVA is a trademark of Oracle Corporation of Redwood Shores, Calif.). In the JAVA platform, applications allocate objects in a Java heap. When the Java heap is close to full, a Java Virtual Machine (JVM) invokes a Garbage Collector (GC) to identify unused objects whose memory can be used for future allocations. Invoking the Garbage Collector usually results in freeing large amounts of memory in the Java heap that can be used for any further object allocations. Hence, memory associated with a Java heap is continuously "modified" throughout the life time of the Java application.

During a live migration from a first physical host to a second physical host, the memory state of a virtual machine and application running in the virtual machine is copied over multiple iterations. For example, in a first iteration, the entirety of the memory state is copied. However, because the application is still operating, some pages of the memory state may be modified during the first iteration. Accordingly, a second iteration copies only those pages of memory that were modified since the first iteration. Subsequent iterations may be performed to copy any pages of memory that are modified after a previous iteration. Such iterations may continue until there are no more pages left to be copied, and the memory state in the second (destination) physical host is the same as the memory state in the first (source) physical host. With the memory state transfer complete, a final transfer of the processor state is performed. In view of the foregoing process for copying the memory state, it should be understood that the total time taken for migration from the first physical host to the second physical host is dependent on network speed, the amount of memory being used by the applications in the guest (virtual machine) and the rate at which memory is modified by the applications running in the guest.

Embodiments of the invention reduce the memory transfer overhead required to perform a live migration, where the memory transfer overhead may be measured by network bandwidth usage or the amount of time required to complete the live migration. In one example, the method may be used to perform live migration of a JAVA virtual machine running one or more JAVA based workloads using managed memory. Accordingly, the JAVA virtual machine will cooperate with the live migration to reduce migration overheads, reduce time to complete live migration, and reduce network usage. The JAVA virtual machine may cooperate transparently with the live migration, without notifying the end user, by using various techniques to reduce the overhead of memory copying.

A Virt-manager (Virtualization manager/hypervisor) provides a notification to the JVM and its applications when the live migration starts, so that the JVM and the applications running in the JVM can take steps to reduce overhead of memory copying. Independently, the Virt-manager may also provide notification to the JVM and its application that the live migrated has completed. In response to receiving notification that the migration has completed, each application may increase the amount of memory that is used following the migration to an amount greater than the reduced amount of memory in use during the migration.

Different methods can be used to make the JVM/application aware of the start and end of live migration process. For example, the notification can be implemented using sockets (in-memory or network), signals (register/notify for a new signal), or other known techniques. In one example, a signaling method is used to make the JVM aware of start and end of the live migration process. New signals will be generated and sent to all of the applications running in the guest virtual machine when the live migration process starts and ends. For instance, a Virt-manager may broadcast a signal SIG_LIVE_MIGRATION_START when the live migration starts, and broadcast a signal SIG_LIVE_MIGRA- TION_END when the live migration has completed. Optionally, the Virt-manager may broadcast these signals, with the help of the Operating System (OS), to all the applications running in the guest virtual machine. Any JVM and any application running in a JVM can then listen for these signals and perform one or more actions to optimize the live migration process.

If the selected virtual machine includes a first application using managed memory, a first method may prevent migration of those portions of the managed memory that contain garbage. Accordingly, once the JVM receives the SIG_LIVE_MIGRATION_START signal, the JVM invokes the Garbage Collector (GC) to identify unused objects in memory. Either the JVM or the GC can identify garbage pages and communicate the identity of the garbage pages to the hypervisor, such that the hypervisor may avoid copying the garbage pages of memory from the source host to the destination host. This in-turn reduces the live migration time to a great extent. In one example, the JVM or application makes an MADVISE system call, which can be used to mark pages containing data that the application doesn't need.

If the selected virtual machine includes a first application using managed memory, a second alternative method may invoke a garbage collector that suspends the first application and frees memory that is no longer in use. Furthermore, in order to reduce the number of memory pages that get dirtied during migration, the method may increase the duration of time that the first application is suspended. While the application thread is suspending, the associated memory is not modified. This may be referred to as bloating the pause time.

If the selected virtual machine includes a first application using managed memory, a third alternative method may reduce the number of memory pages in use during the migration by reducing the heap size. During normal operation, applications may be tuned to run with a larger java heap than what it really needs to operate properly in order to improve the overall performance. However, most applications can work well with a smaller heap size so long as the heap is managed properly, such as maintaining a low extent of fragmentation. In order to help live migration, the JVM can exploit this and work with a reduced heap size during the migration period. This means that a smaller active heap is modified and the remaining heap area is untouched, which reduces the overhead of copying Java heap from one host to another host. For example, if an application is started with 1 GB heap, it can be reduced to a 512 MB heap when live migration starts. This reduces the overhead of copying the active 512 MB of memory from one host to another host.

Optionally, when the heap size has been reduced for live migration, the heap size may be increased in response to receiving notification that the migration has completed. The increase in the heap size may be implemented by providing a new heap size limit or simply removing the heap size constraint that was applied during the migration. Furthermore, since the JVM and its applications run on a different physical host after the migration, the destination host may control the subsequent size of the heap.

In a further alternative method, a Just-In-Time (JIT) compiler is instructed to defer compilation of any hot method in response to receiving notification that the migration has started. A Just-In-Time (JIT) compiler translates the bytecode of hot methods into machine code at run time in order to improve the performance of the application. JIT uses lots of memory to perform several optimizations and also to generate the machine code, which often results in updating lots of memory. In order to cooperate with migration, the JIT compiler is instructed to defer compilation of any hot methods when live migration starts. This ensures that new pages won't be created or dirtied, such that the migration may complete sooner. In response to receiving notification that the migration has completed, the just-in-time compiler may be allowed to compile hot methods as needed.

In yet another alternative method, the caches and/or intermediate buffers in use by the applications running on the selected virtual machine may be released in response to receiving notification that the migration has started. A JVM uses caches and intermediate buffers internally in order to improve its performance. The sizes of these caches can be varied from few Kilobytes to many Megabytes. In order to help migration, the JVM is instructed to release these caches when migration starts and rebuild them as and when required once live migration ends. Releasing the caches and/or intermediate buffers will reduce the overhead of copying these pages from the source host to the destination host.

One of the caches in a JVM is a zip cache which contains (maps) the class files from file system to memory. The JVM uses this cache to load class files. In order to help live migration, the JVM can release this cache when live migration starts and re-build it when needed after live migration ends. Similarly, the NIO (New I/O) library creates and caches lot of intermediate buffers (Direct Byte Buffers) to send/receive data for the channel. In order to help migration, the JVM may release these buffers and rebuild after migration ends. Regardless of the particular cache or buffer, the selected virtual machine may be allowed to rebuild these caches or buffers as needed by the applications running on the selected virtual machine in response to receiving the notification that the migration has completed.

Another embodiment of the present invention provides a computer program product including computer usable program code embodied on a computer usable storage medium for reducing network traffic associated with live migration. The computer program product comprises computer usable program code for selecting a virtual machine on a first physical host for migration to a second physical host, and computer usable program code for providing each application running in the selected virtual machine with notification that the migration has started. The computer program product further includes computer usable program code for each application reducing the number of memory pages in use during the migration in response to receiving the notification that the migration has started, and computer usable program code for migrating the selected virtual machine and each application from the first physical host to the second physical host, wherein the migration of each application includes migration of the reduced number of memory pages. It should be recognized that the computer program product may further comprise computer usable program code for implementing or performing any one or more portion of the foregoing computer-implemented methods.

It should be understood that although this disclosure is applicable to cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
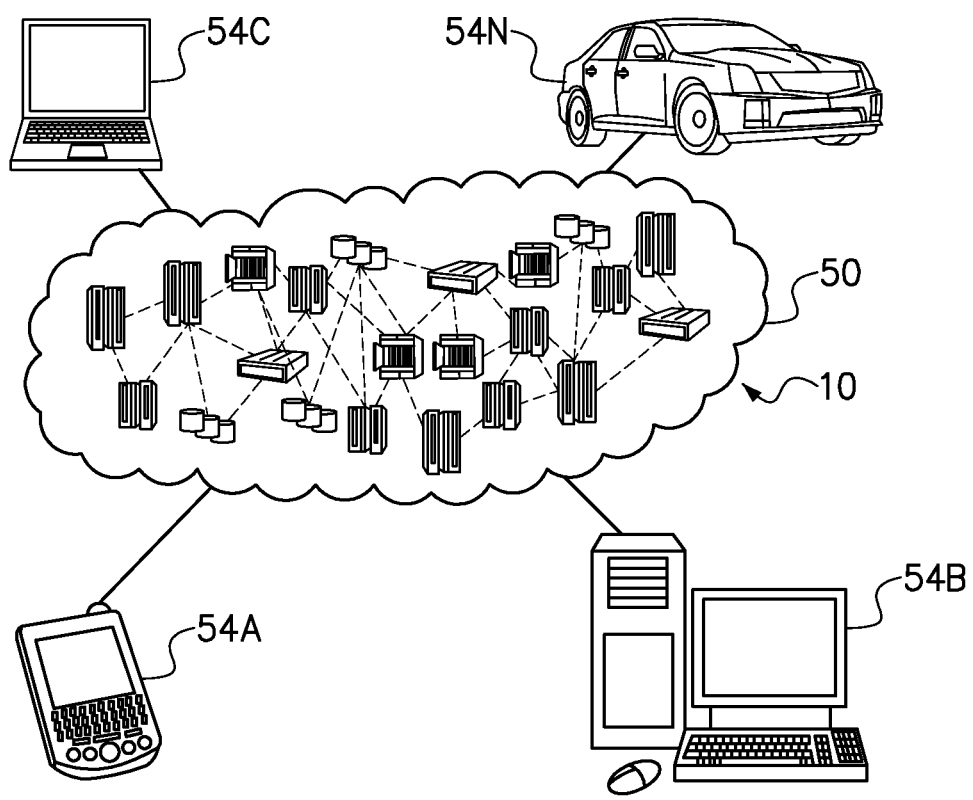
FIG. 2 is a diagram of a cloud computing environment according to one or more embodiment of the present invention.

Referring now to FIG. 2, an illustrative cloud computing environment 50 is depicted. As shown, the cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
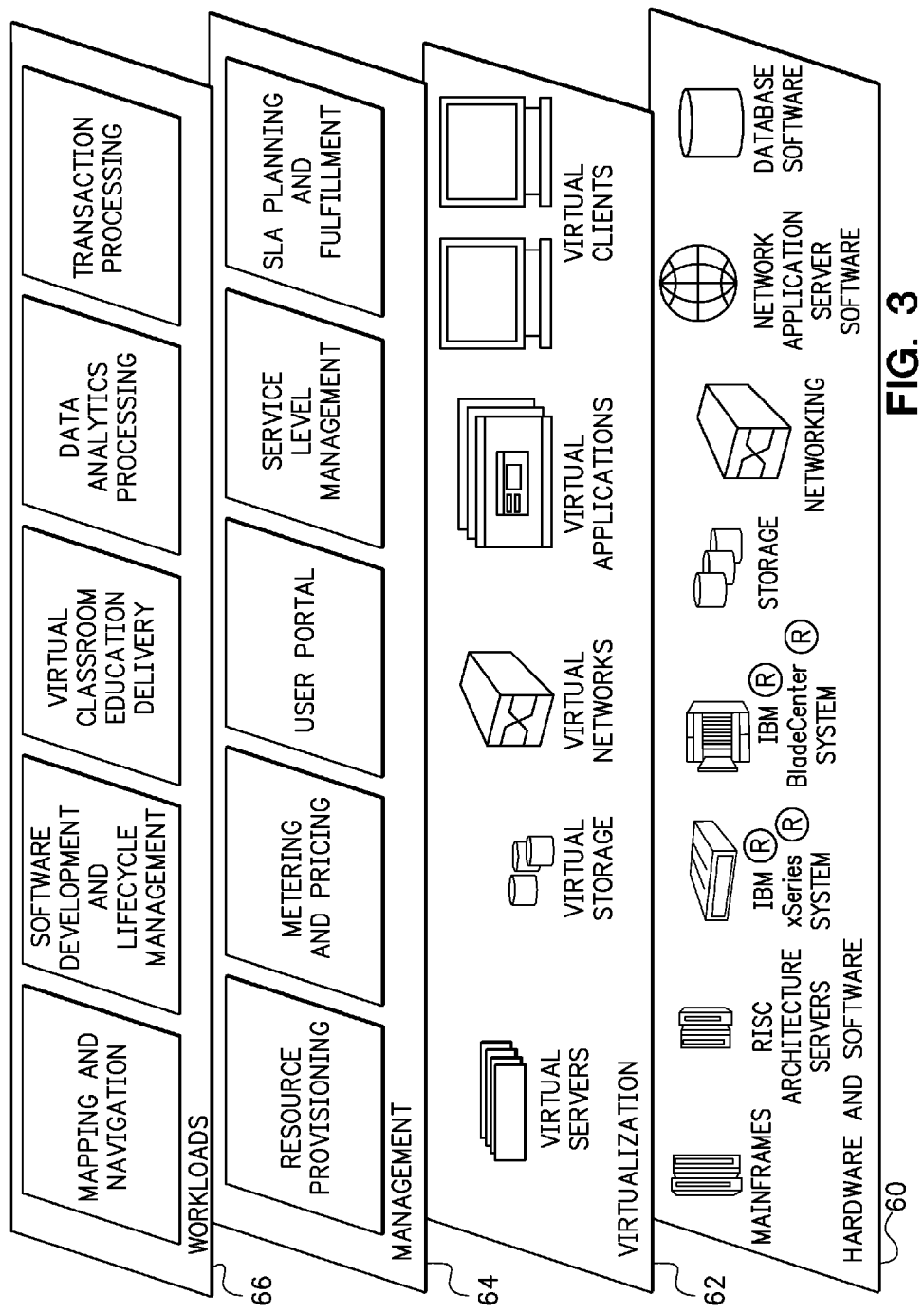
FIG. 3 is a diagram depicting abstraction model layers according to one or more embodiment of the present invention.

Referring now to FIG. 3, a set of functional abstraction layers provided by cloud computing environment 50 (Shown in FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

Figure 4:
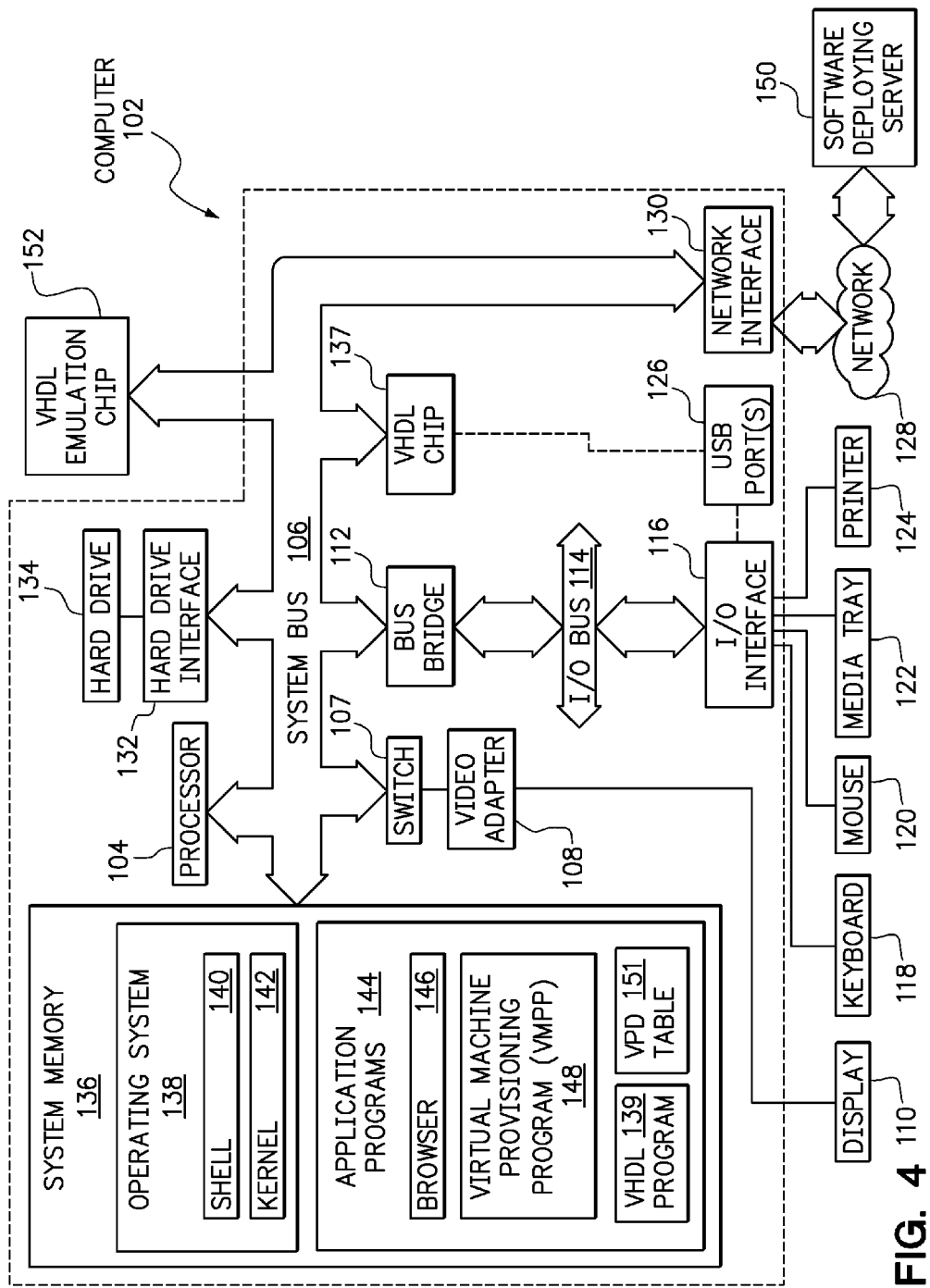
FIG. 4 is a diagram of an exemplary computing node that may be utilized according to one or more embodiments of the present invention.

FIG. 4 depicts an exemplary computing node (or simply "computer") 102 that may be utilized in accordance with one or more embodiments of the present invention. Note that some or all of the exemplary architecture, including both depicted hardware and software, shown for and within computer 102 may be utilized by the software deploying server 150, as well as the provisioning manager/management node 222 and the server blades 204a-n shown in FIG. 5. Note that while the server blades described in the present disclosure are described and depicted in exemplary manner as server blades in a blade chassis, some or all of the computers described herein may be stand-alone computers, servers, or other integrated or stand-alone computing devices. Thus, the terms "blade," "server blade," "computer," and "server" are used interchangeably in the present descriptions.

Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions (e.g., virtual machine provisioning program—VMPP 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, some or all of these ports may be universal serial bus (USB) ports.

As depicted, computer 102 is able to communicate with a software deploying server 150 via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

The operating system 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

The application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

The application programs 144 in the system memory of computer 102 (as well as the system memory of the software deploying server 150) also include a virtual machine provisioning program (VMPP) 148. VMPP 148 includes code for implementing the processes described below, including those described in FIGS. 2-8. VMPP 148 is able to communicate with a vital product data (VPD) table 151, which provides required VPD data described below. In one embodiment, the computer 102 is able to download VMPP 148 from software deploying server 150, including in an on-demand basis. Note further that, in one embodiment of the present invention, software deploying server 150 performs all of the functions associated with the present invention (including execution of VMPP 148), thus freeing computer 102 from having to use its own internal computing resources to execute VMPP 148.

Also stored in the system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from VMPP 148 causes the VHDL program 139 to configure the VHDL chip 137, which may be an FPGA, ASIC, or the like.

In another embodiment of the present invention, execution of instructions from VMPP 148 results in a utilization of VHDL program 139 to program a VHDL emulation chip 151. VHDL emulation chip 151 may incorporate a similar architecture as described above for VHDL chip 137. Once VMPP 148 and VHDL program 139 program VHDL emulation chip 151, VHDL emulation chip 151 performs, as hardware, some or all functions described by one or more executions of some or all of the instructions found in VMPP 148. That is, the VHDL emulation chip 151 is a hardware emulation of some or all of the software instructions found in VMPP 148. In one embodiment, VHDL emulation chip 151 is a programmable read only memory (PROM) that, once burned in accordance with instructions from VMPP 148 and VHDL program 139, is permanently transformed into a new circuitry that performs the functions needed to perform the processes of the present invention.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

A cloud computing environment allows a user workload to be assigned to a virtual machine (VM) somewhere in the computing cloud. This virtual machine provides the software operating system and physical resources such as processing power and memory to support the user's application workload. The present disclosure describes methods for placing virtual machines among physical servers based on workload bids submitted by a plurality of servers in response to a workload bid request received from another one of the servers.

Figure 5:
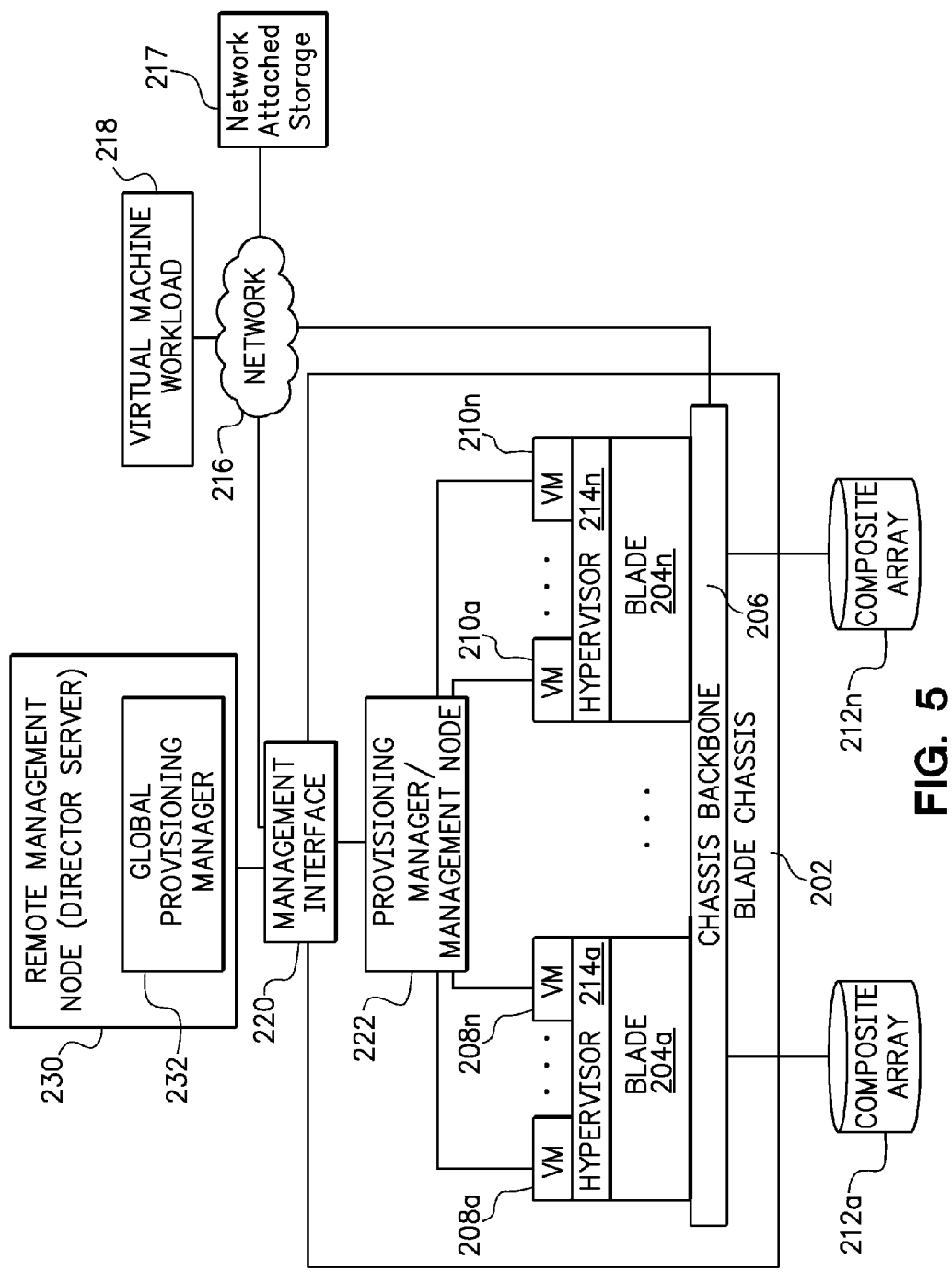
FIG. 5 is a diagram of an exemplary blade chassis that may be utilized according to one or more embodiments of the present invention.

FIG. 5 depicts an exemplary blade chassis that may be utilized in accordance with one or more embodiments of the present invention. The exemplary blade chassis 202 may operate in a "cloud" environment to provide a pool of resources. Blade chassis 202 comprises a plurality of blades 204a-n (where "a-n" indicates an integer number of blades) coupled to a chassis backbone 206. Each blade supports one or more virtual machines (VMs). As known to those skilled in the art of computers, a VM is a software implementation (emulation) of a physical computer. A single hardware computer (blade) can support multiple VMs, each running the same, different, or shared operating systems. In one embodiment, each VM can be specifically tailored and reserved for executing software tasks 1) of a particular type (e.g., database management, graphics, word processing etc.); 2) for a particular user, subscriber, client, group or other entity; 3) at a particular time of day or day of week (e.g., at a permitted time of day or schedule); etc.

As depicted in FIG. 5, blade 204a supports VMs 208a-n (where "a-n" indicates an integer number of VMs), and blade 204n supports VMs 210a-n (wherein "a-n" indicates an integer number of VMs). Blades 204a-n are coupled to a storage device 212 that provides a hypervisor 214, guest operating systems, and applications for users (not shown). Provisioning software from the storage device 212 allocates boot storage within the storage device 212 to contain the maximum number of guest operating systems, and associates applications based on the total amount of storage (such as that found within storage device 212) within the cloud. For example, support of one guest operating system and its associated applications may require 1 GByte of physical memory storage within storage device 212 to store the application, and another 1 GByte of memory space within storage device 212 to execute that application. If the total amount of memory storage within a physical server, such as boot storage device 212, is 64 GB, the provisioning software assumes that the physical server can support 32 virtual machines. This application can be located remotely in the network 216 and transmitted from the network attached storage 217 to the storage device 212 over the network. The global provisioning manager 232 running on the remote management node (Director Server) 230 performs this task. In this embodiment, the computer hardware characteristics are communicated from the VPD 151 to the VMPP 148. The VMPP 148 communicates the computer physical characteristics to the blade chassis provisioning manager 222, to the management interface 220, and to the global provisioning manager 232 running on the remote management node (Director Server) 230.

Note that chassis backbone 206 is also coupled to a network 216, which may be a public network (e.g., the Internet), a private network (e.g., a virtual private network or an actual internal hardware network), etc. Network 216 permits a virtual machine workload 218 to be communicated to a management interface 220 of the blade chassis 202. This virtual machine workload 218 is a software task whose execution, on any of the VMs within the blade chassis 202, is to request and coordinate deployment of workload resources with the management interface 220. The management interface 220 then transmits this workload request to a provisioning manager/management node 222, which is hardware and/or software logic capable of configuring VMs within the blade chassis 202 to execute the requested software task. In essence the virtual machine workload 218 manages the overall provisioning of VMs by communicating with the blade chassis management interface 220 and provisioning management node 222. Then this request is further communicated to the VMPP 148 in the computer system. Note that the blade chassis 202 is an exemplary computer environment in which the presently disclosed methods can operate. The scope of the presently disclosed system should not be limited to a blade chassis, however. That is, the presently disclosed methods can also be used in any computer environment that utilizes some type of workload management or resource provisioning, as described herein. Thus, the terms "blade chassis," "computer chassis," and "computer environment" are used interchangeably to describe a computer system that manages multiple computers/blades/servers.

Figure 6:
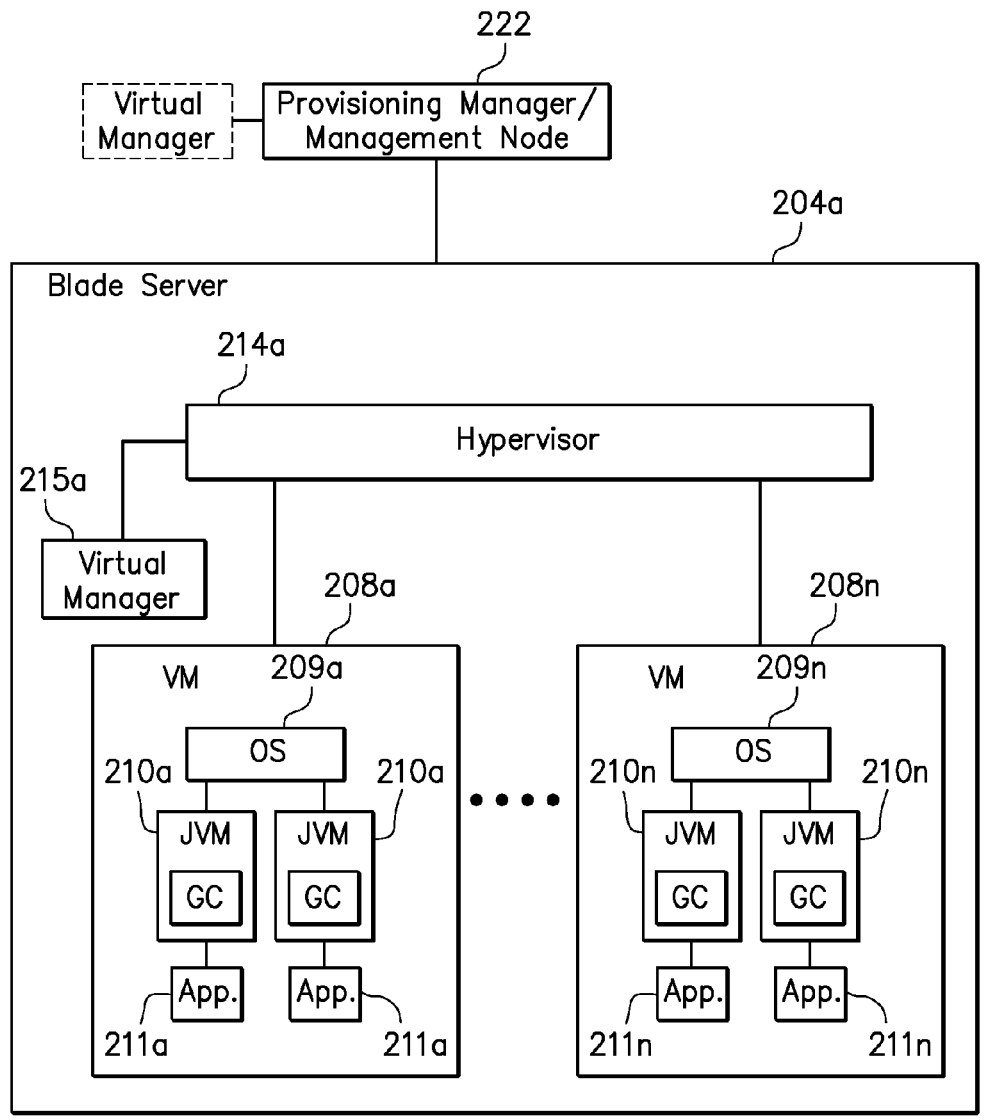
FIG. 6 is a diagram of an operating environment within an individual blade server including a Virt-manager.

FIG. 6 is a diagram of an operating environment within an individual blade server 204a. As with FIG. 5, the blade server 204a includes a hypervisor 214a and illustrates two virtual machines 208a, 208n though there may any number of one or more ("n") virtual machines. Each of the virtual machines 208a, 208n runs an operating system (OS) 209a, 209n, a Java Virtual Machine (JVM) 210a, 210n with a garbage collector, and one or more applications (App.) 211a, 211n. The system also includes a Virt-manager in accordance with various embodiments of the present invention. The Virt-manager 215a is shown operating on the blade 204a in conjunction with the hypervisor 214a, but may alternatively be run from various other locations, such as in conjunction with the provisioning manager and management node 222 (see Virt-manager with a dashed outline).

A global provisioning manager 232 (see FIG. 5) or local provisioning manager 222 (See also FIG. 5) may determine that a VM should be moved to another server via live migration, and provide that instruction to the relevant hypervisor 214a. The Virt-manager 215a receives this instruction and is responsible for providing a notification to the selected VM and its applications when the live migration starts, so that the VM and the applications running in the VM can implement one or more methods to reduce overhead of memory copying. These one or more methods have been described above.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for reducing network traffic associated with live migration, comprising:
    selecting a virtual machine on a first physical host for migration to a second physical host;
    providing each application running in the selected virtual machine with a notification that the migration has started;
    in response to receiving the notification that the migration has started, each application reducing the number of memory pages in use;
    migrating the selected virtual machine and each application from the first physical host to the second physical host, wherein the migration of each application includes migration of the reduced number of memory pages; and
    in response to receiving notification that the migration has started, instructing a just-in-time compiler to defer compilation of the bytecode of a method into machine code.

2. The computer-implemented method of claim 1, further comprising:
    providing notification to each application that the migration has completed; and
    in response to receiving notification that the migration has completed, each application allowing the just-in-time compiler to compile the method.

3. A computer-implemented method for reducing network traffic associated with live migration, comprising:
    selecting a virtual machine on a first physical host for migration to a second physical host;
    providing each application running in the selected virtual machine with a notification that the migration has started;
    in response to receiving the notification that the migration has started, each application reducing the number of memory pages in use;
    migrating the selected virtual machine and each application from the first physical host to the second physical host, wherein the migration of each application includes migration of the reduced number of memory pages; and
    in response to receiving notification that the migration has started, instructing the selected virtual machine to release caches in use by the applications running on the selected virtual machine.

4. The computer-implemented method of claim 3, further comprising:
    providing each application with notification that the migration has completed; and
    in response to receiving the notification that the migration has completed, allowing the selected virtual machine to rebuild caches as needed by the applications running on the selected virtual machine.

5. The computer-implemented method of claim 3, wherein the selected virtual machine is running a Java Virtual Machine using a zip cache.

6. A computer program product including computer usable program code embodied on a computer usable storage medium for reducing network traffic associated with live migration, the computer program product comprising:
    computer usable program code for selecting a virtual machine on a first physical host for migration to a second physical host;
    computer usable program code for providing each application in the selected virtual machine with notification that the migration has started;
    computer usable program code for each application reducing the number of memory pages in use during the migration in response to receiving the notification that the migration has started;
    computer usable program code for migrating the selected virtual machine and each application from the first physical host to the second physical host, wherein the migration of each application includes migration of the reduced number of memory pages; and
    computer usable program code for instructing a just-in-time compiler to defer compilation of the bytecode of a method into machine code in response to receiving the notification that the migration has started.

7. The computer program product of claim 6, further comprising:
    computer usable program code for providing each application with notification that the migration has completed; and computer usable program code for each application allowing the just-in-time compiler to compile the method in response to receiving notification that the migration has completed.

8. A computer program product including computer usable program code embodied on a computer usable storage medium for reducing network traffic associated with live migration, the computer program product comprising:

computer usable program code for selecting a virtual machine on a first physical host for migration to a second physical host;

computer usable program code for providing each application in the selected virtual machine with notification that the migration has started;

computer usable program code for each application reducing the number of memory pages in use during the migration in response to receiving the notification that the migration has started;

computer usable program code for migrating the selected virtual machine and each application from the first physical host to the second physical host, wherein the migration of each application includes migration of the reduced number of memory pages; and computer usable program code for instructing the selected virtual machine to release caches in use by the applications running on the selected virtual machine in response to receiving notification that the migration has started.

9. The computer program product of claim 8, further comprising:

computer usable program code for providing notification to each application that the migration of the selected virtual machine has completed; and computer usable program code for allowing the selected virtual machine to rebuild caches as needed by the applications running on the selected virtual machine in response to receiving the notification that the migration has completed.

* * * * *